United States Patent
Pollack et al.

(10) Patent No.: US 11,757,978 B2
(45) Date of Patent: Sep. 12, 2023

(54) MULTI-PATH CONNECTION MANAGEMENT

(71) Applicant: Apple Inc., Cupertino, CA (US)

(72) Inventors: Daniel B. Pollack, San Jose, CA (US);
Padmavathy Bhooma, Los Gatos, CA (US); Jingyao Zhang, Sunnyvale, CA (US); Chieh Lu, San Jose, CA (US);
Karthick Santhanam, San Jose, CA (US); Christopher M. Garrido, San Jose, CA (US); Bradley F. Patterson, Morgan Hill, CA (US); Kevin Arthur Robertson, Sunnyvale, CA (US);
Hsien-Po Shiang, Mountain View, CA (US); Qian Sun, Cupertino, CA (US);
Erik Vladimir Ortega Gonzalez, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 17/006,738

(22) Filed: Aug. 28, 2020

(65) Prior Publication Data
US 2021/0075850 A1 Mar. 11, 2021

Related U.S. Application Data

(60) Provisional application No. 62/897,987, filed on Sep. 9, 2019.

(51) Int. Cl.
*H04L 67/10* (2022.01)
*H04L 43/16* (2022.01)
(Continued)

(52) U.S. Cl.
CPC ............ *H04L 67/10* (2013.01); *H04L 1/0002* (2013.01); *H04L 43/16* (2013.01); *H04L 69/167* (2013.01); *H04W 76/15* (2018.02)

(58) Field of Classification Search
CPC ....... H04L 67/10; H04L 1/0002; H04L 43/16; H04L 69/167; H04L 1/08; H04L 43/0882;
(Continued)

(56) References Cited

U.S. PATENT DOCUMENTS 11,277,203 B1 * 3/2022 McLinden ......... H04B 10/1143
2016/0323408 A1 * 11/2016 Chung ................ H04L 67/1004
(Continued)

*Primary Examiner* — Abdullahi Ahmed
(74) *Attorney, Agent, or Firm* — BAKERHOSTETLER

(57) ABSTRACT

A device implementing a system for multipath connection management may include first and second local communication interfaces, and a processor configured to establish a primary connection for communicating between the first local communication interface and a first remote communication interface of an other device, and a secondary connection for communicating between the second local communication interface and a second remote communication interface. The processor may be configured to transmit application and control data over the primary connection and concurrently transmit a copy of control data over the secondary connection. The processor may be configured to determine that a degradation of the quality of the primary connection is attributable to the other device. The processor may be configured to switch the secondary connection to the first local communication interface and the second remote communication interface. The processor may be configured to transmit a copy of the application and control data over the secondary connection.

20 Claims, 5 Drawing Sheets

(51) Int. Cl.
*H04W 76/15* (2018.01)
*H04L 1/00* (2006.01)
*H04L 69/167* (2022.01)

(58) Field of Classification Search
CPC . H04L 65/1069; H04L 65/1086; H04L 67/75; H04L 69/14; H04L 43/0829; H04L 43/0864; H04L 43/10; H04L 43/50; H04L 41/0663; H04L 43/0805; H04W 76/15
See application file for complete search history.

(56) References Cited

U.S. PATENT DOCUMENTS

| | | | |
|---|---|---|---|
| 2018/0184330 A1* | 6/2018 | Egner | H04L 43/0876 |
| 2020/0174466 A1* | 6/2020 | Zhang | G05D 1/0022 |
| 2020/0396499 A1* | 12/2020 | Rasool | H04N 21/42215 |
| 2021/0112295 A1* | 4/2021 | Birkbeck | H04N 21/812 |
| 2021/0329057 A1* | 10/2021 | Wang | H04W 4/029 |

* cited by examiner

MULTI-PATH CONNECTION MANAGEMENT

CROSS REFERENCE TO RELATED APPLICATIONS

This application claims the benefit of U.S. Provisional Patent Application No. 62/897,987, entitled "Multi-Path Connection Management, filed on Sep. 9, 2019, the disclosure of which is hereby incorporated herein in its entirety.

TECHNICAL FIELD

The present description relates generally to connection management, including multi-path connection management.

BACKGROUND

A user of an electronic device may participate in a communication session, such as an audio and/or video conference session, with one or more other participants using their respective devices. Each of the participant devices may have respective communication interfaces (e.g., WiFi and/or cellular), and the availability of these interfaces may change during an audio-video conference session.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

When an electronic device initiates a communication session with another electronic device, the devices may attempt to establish a connection using a preferred link, such as Wi-Fi. However, if the connection cannot be established using the preferred link, the communication session may fail, even though one or more additional links may be available between the electronic devices.

The subject system provides for improved performance for both connection establishment of communication sessions, and during the communication sessions, by leveraging multiple different links (or paths) available between the electronic devices. The subject system allows the electronic devices to dynamically fall back to one or more additional links when a connection cannot be established using the preferred link. In addition, the subject system utilizes additional available links to establish a secondary connection for the communication session that is maintained concurrently with the primary connection. The secondary connection may be used for redundant transmission of control data for the communication session and, when the quality of the primary connection degrades, the secondary connection may be used for redundant transmission of application data for the communication session.

The electronic devices may periodically exchange link quality data for the available links to continuously monitor and/or evaluate the quality of the available links. The electronic devices may dynamically change the link used for the primary and/or secondary connection based on the monitored/evaluated quality of the available links and/or based on the link quality of the links currently being used for the primary and/or secondary connections.

Figure 1:
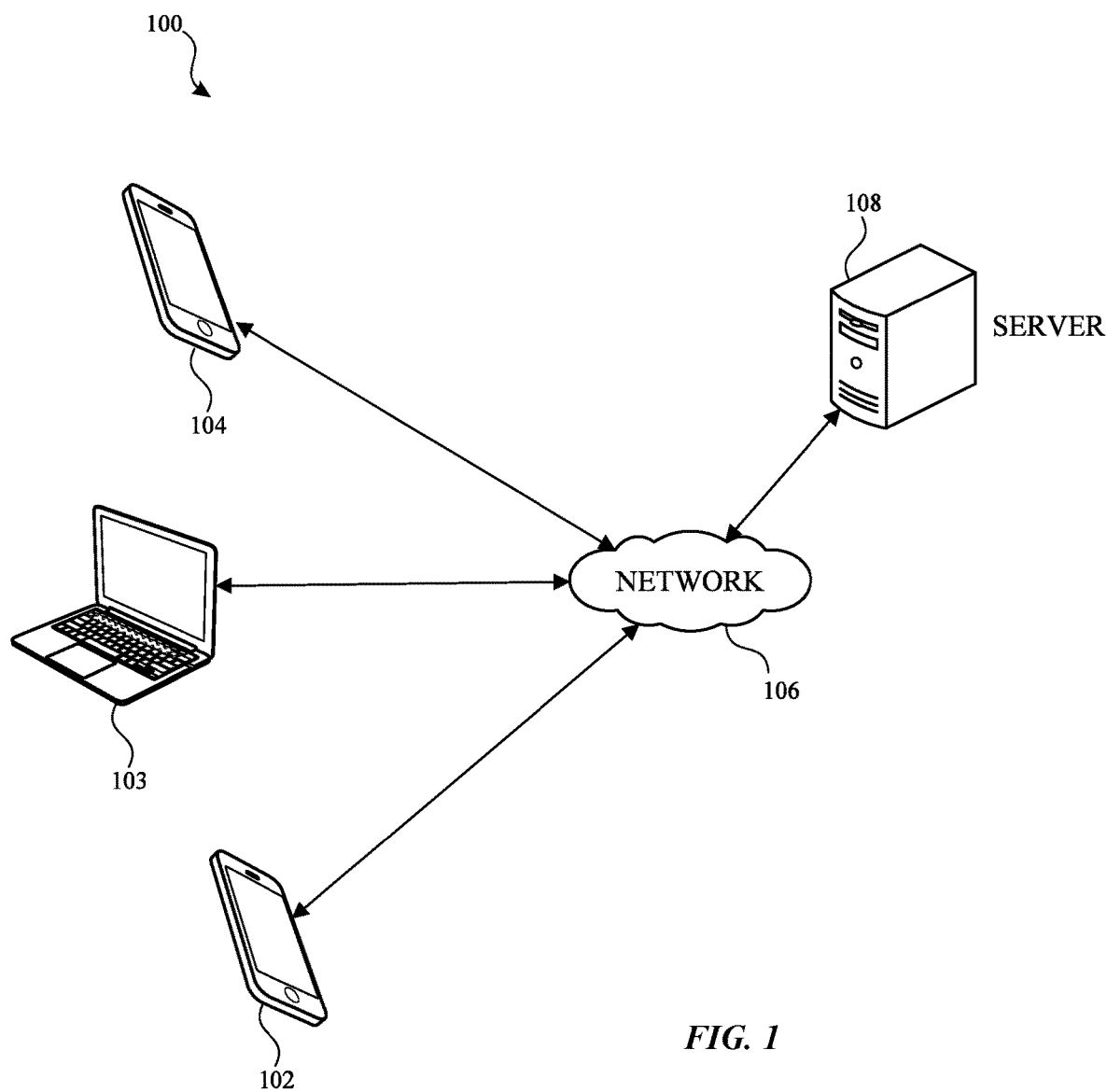
FIG. 1 illustrates an example network environment for multi-path connection establishment in accordance with one or more implementations.

FIG. 1 illustrates an example network environment for multi-path connection establishment in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, and 104, a network 106 and a server 108. The network 106 may communicatively (directly or indirectly) couple, for example, any two or more of the electronic devices 102-104 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

The server 108 may be, and/or may include all or part of the electronic system discussed below with respect to FIG. 5. The server 108 may include one or more servers, such as a cloud of servers, that may be used to facilitate in audio-video conferencing between the electronic devices 102-104. For explanatory purposes, a single server 108 is shown and discussed with respect to various operations, such as facilitating audio-video conferencing. However, these and other operations discussed herein may be performed by one or more servers, and each different operation may be performed by the same or different servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., WiFi) radios, cellular radios, Bluetooth radios, Zigbee radios, near field communication (NFC) radios, and/or other wireless radios. In FIG. 1, by way of example, the electronic devices 102 and 104 are each depicted as a smartphone and the electronic device 103 is depicted as a laptop computer.

The electronic devices 102-104 may be configured to participate in communication sessions, such as audio-video conferencing sessions, for example, where two or more of the electronic devices 102-104 may participate in a conversation in which video and/or audio content streams (e.g., application data) are transmitted between the participant devices. Each of the electronic devices 102-104 may be, and/or may include all or part of, the device discussed below with respect to FIG. 2, and/or the electronic system discussed below with respect to FIG. 5.

In the subject system, when a user of one of the electronic devices 102-104, such as the electronic device 102, initiates a communication session with a user of another of the electronic devices 103-104, such as the electronic device 104, the electronic devices 102, 104 may attempt to establish a primary connection via a preferred link for communicating between the electronic devices 102, 104. For example, the electronic devices 102, 104 may attempt to establish the primary connection for communicating between the Wi-Fi communication interfaces of the electronic devices 102, 104.

If the electronic devices 102, 104 cannot establish the primary connection via the preferred link, the electronic devices 102, 104 may attempt to establish the primary connection via one or more additional available links, such as a link for communicating between the cellular communication interfaces of the electronic devices 102, 104. Once established, the primary connection may be used by the electronic devices 102, 104 to transmit control data and application data for the communication session. An example process of multi-path connection establishment is discussed further below with respect to FIG. 3.

Once the primary connection is established for the communication session between the electronic devices 102, 104, the electronic devices 102, 104 may evaluate the additional available links to establish a secondary connection for the communication session The secondary connection may be established via a link that is diverse from the link used for the primary connection. Once the secondary connection is established, the electronic devices 102, 104 may transmit a copy of at least a portion of the control data for the communication session over the secondary connection. In this manner, the control data can be redundantly transmitted over the secondary connection.

When the electronic devices 102, 104 detect that the quality of the primary connection has degraded, the electronic devices 102, 104 may start transmitting a copy of all the application data and control data over the secondary connection. The electronic devices 102, 104 may also evaluate the available links and determine whether a different link should be selected for the primary and/or secondary connections. In one or more implementations, if the secondary connection utilizes a cellular communication interface (and/or other communication interface associated with metered data traffic) of the electronic device 102 or 104, and if the transmission of the copy of the application data and/or control data exceeds a particular bandwidth constraint, the electronic device 102 or 104 may display an indication to the user that the cellular communication interface is being used to transmit the copy of the application data and/or control data. An example process for multi-path connection management is discussed further below with respect to FIG. 4.

A 'link,' as used herein, may refer to a particular communication path for communicating between two of the electronic devices 102-104, such as the electronic devices 102 and 104. A link may be characterized by a set of link parameters that may include: a particular local communication interface (e.g., Wi-Fi, cellular, etc.), a particular remote communication interface, a packet type (e.g., user datagram protocol (UDP), transmission control protocol (TCP), etc.), an internet protocol (IP) version type (e.g., IPv4, IPv6, etc.), a connection type, e.g. peer-to-peer or through the server 108 (e.g., a relay server), and/or generally any configurable properties/parameters of a link. Thus, the electronic devices 102, 104 may establish different links by utilizing a different set of link parameters for each link. In one or more implementations, different applications and/or communication sessions may be associated with different sets of preferred link parameters.

By utilizing the secondary connection to transmit redundant control and/or application data, the subject system may improve the performance/reliability of the communication session. Furthermore, by leveraging multiple different links that are characterized by diverse sets of link parameters, as well as providing for dynamic fallback from link to link, the subject system may improve the reliability of establishing a connection for a communication session.

Figure 2:
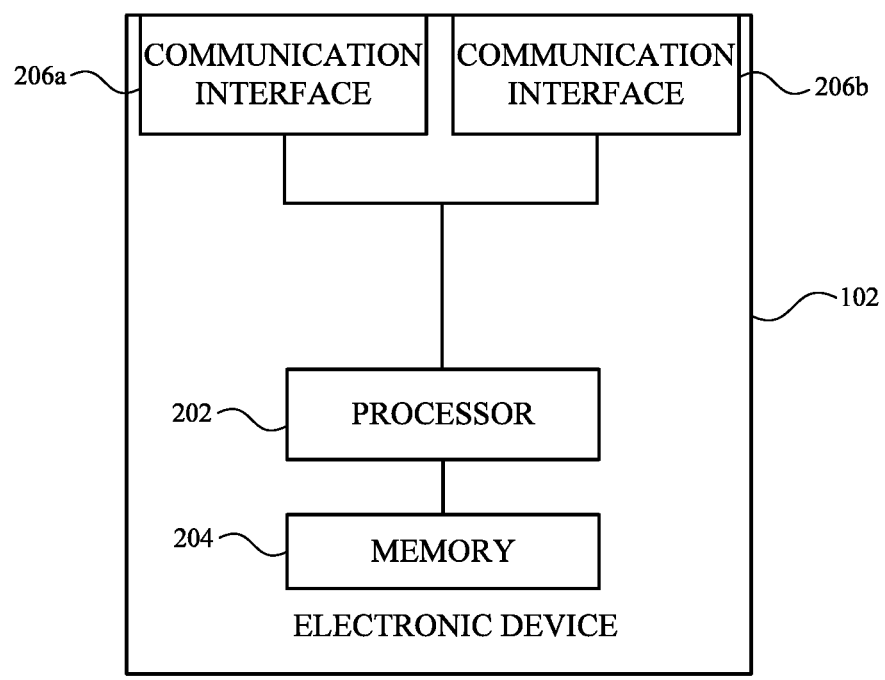
FIG. 2 illustrates an example device that may implement a system for multi-path connection establishment in accordance with one or more implementations.

FIG. 2 illustrates an example electronic device 102 that may implement a system for multi-path connection establishment in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and communication interfaces 206a-206b. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The memory 204 may store an application (e.g., an audio-video conferencing application) which is configured to facilitate using multiple connections within an audio-video conference session. In one or more implementations, the audio-video conferencing application may be part of or otherwise incorporated within an operating system of the electronic device 102.

The communication interfaces 206a-206b may include suitable logic, circuitry, and/or code that enables wired or wireless communication, such as between any of the other electronic devices 103-104 and/or the server 108 over the network 106. In one or more implementations, all or part of the same circuitry may be shared by both of the communication interfaces 206a-206b. The communication interfaces 206a-206b may include, for example, one or more of a Bluetooth communication interface, a cellular communication interface (e.g., 3G, 4G, LTE, 5G, etc.), an NFC interface, a Zigbee communication interface, a WLAN communication interface, (WiFi, WiMAX, LiFi, 2.4 GHz, 5 GHz, etc.) communication interface, a USB communication interface, an Ethernet communication interface, a millimeter wave (e.g., 60 GHz) communication interface, or generally any communication interface.

In one or more implementations, when one of the communication interfaces 206a-206b, such as the communication interface 206a, is capable of communicating via different communication protocols, standards, and/or frequencies, such as LTE, 5G, etc., each of the different communication protocols, standards, and/or frequencies may be considered a different link parameter for purposes of establishing available links with another electronic device.

For explanatory purposes, the electronic device 102 is illustrated in FIG. 2 as including two communication interfaces 206a-206b; however, the electronic device 102 may include any number of communication interfaces.

In one or more implementations, one or more of the processor 202, the memory 204, the communication interfaces 206a-206b, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
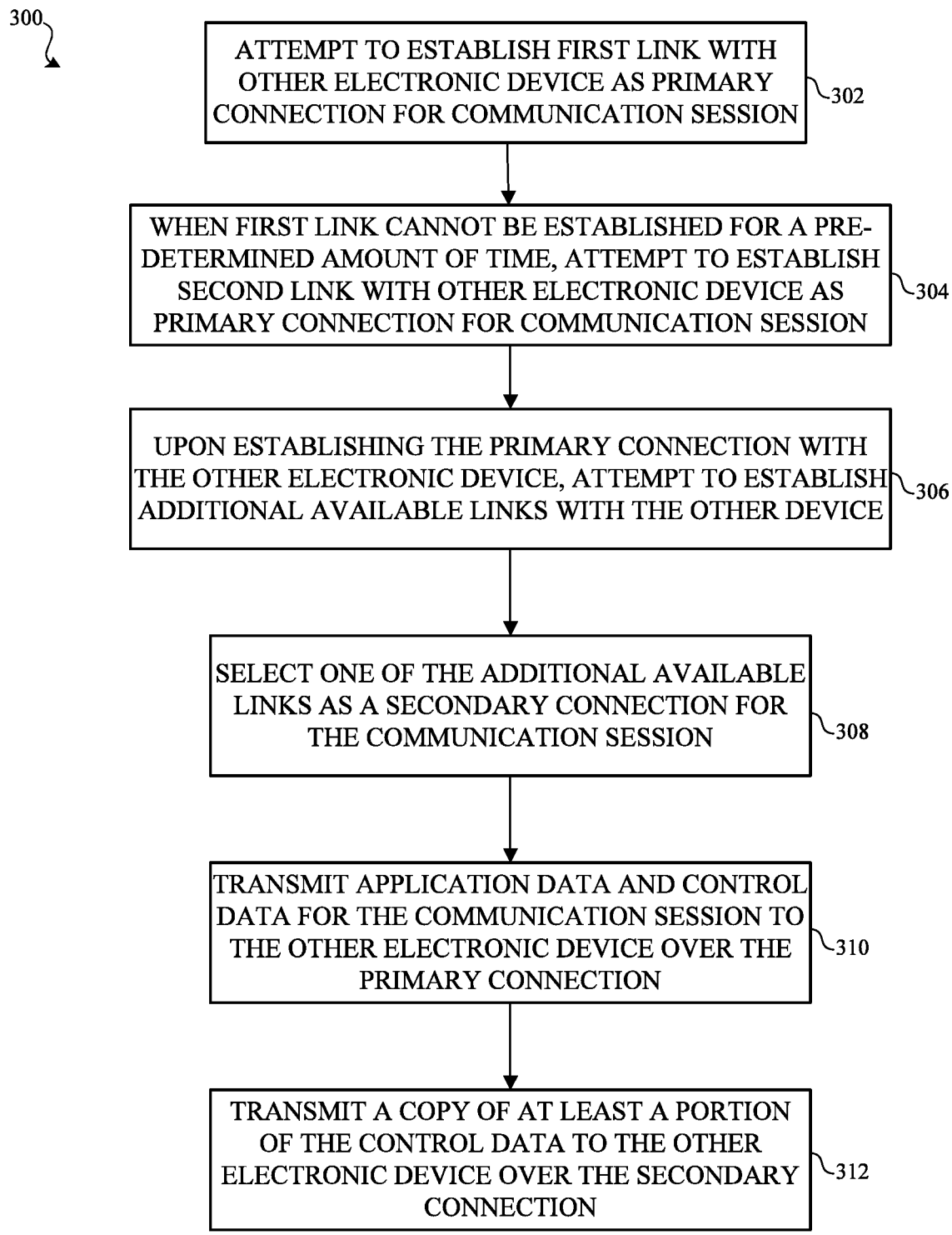
FIG. 3 illustrates a flow diagram of an example process of multi-path connection establishment in accordance with one or more implementations.

FIG. 3 illustrates a flow diagram of an example process 300 of multi-path connection establishment in accordance with one or more implementations. For explanatory purposes, the process 300 is primarily described herein with reference to the electronic devices 102, 104 of FIG. 1. However, the process 300 is not limited to the electronic devices 102, 104 of FIG. 1, and one or more blocks (or operations) of the process 300 may be performed by one or more other components of the server 108 and by other suitable devices (e.g., any of the electronic devices 102-104). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

When the electronic device 102 receives user input to initiate a communication session with an electronic device 104 of another user, the electronic device 102 attempts to establish a first link with the other electronic device 104 as a primary connection for the communication session (302). The first link may be a pre-configured preferred link for the communication session, e.g. pre-configured for the particular application. In one or more implementations, the first link may utilize, for example, local and remote Wi-Fi communication interface, IPv4, a peer-to-peer connection and/or UDP packets. In one or more implementations, the first link may be dynamically selected by the electronic devices 102, 104, such as based on network conditions and/or other environmental conditions.

When the electronic device 102 cannot establish the first link with the electronic device 104 for a pre-determined amount of time, the electronic device 102 may attempt to establish a second, different, link with the other electronic device 104 as the primary connection for the communication session (304). Since the establishment of the first link ostensibly failed, the link parameters of the second link may be selected to be diverse from the parameters of the first link. For example, the second link may utilize local and remote cellular communication interfaces instead of local and remote Wi-Fi communication interfaces. In one or more implementations, the pre-determined amount of time may be set dynamically, such as based on network conditions, and/or other conditions that may be determinable by the electronic device 102.

In one or more implementations, when the electronic device 102 cannot establish the first or second link as the primary connection with the electronic device 104, the electronic device 102 may continue to dynamically fallback to attempt other links for the primary connection with the electronic device 104. The electronic device 102 may continue to try additional links until all of the different combinations of link properties have been exhausted, and/or until a timeout is reached.

Upon establishing the primary connection with the other electronic device 104 via the first or second link (or other link), the electronic device 102 attempts to establish additional available links with the electronic device 104 (306). For example, the electronic devices 102, 104 may exchange available link parameters with each other. The available link parameters may indicate, for example, the communication interfaces available at each of the electronic devices 102, 104, and/or other communication capabilities of each of the electronic devices 102, 104.

The electronic devices 102, 104 may utilize the available link parameters to establish different available links. Each of the different available links may be characterized by a different combination of link parameters. For example, a first available link may be characterized by a local Wi-Fi communication interface and a remote cellular communication interface, a second available link may be characterized by a local and remote cellular communication interface, and a third available link may be characterized by a local cellular communication interface and a remote Wi-Fi communication interface. In one or more implementations, the available links may be further characterized by any of the aforementioned link parameters, such as packet type, connection type, IP version, etc.

In one or more implementations, the electronic device 102 may generate, and continuously evaluate, a list of the different links that are available with the electronic device 104. The electronic device 102 may order the list based at least in part on one or more heuristics with respect to the link being used for the primary connection. For example, the electronic device 102 may order the list of available links based on a diversity of the links with respect to the link used for the primary connection, such that the first ordered link is the link most likely to maintain a connection if/when the primary connection were to fail, and/or the electronic device 102 may order the list based on a respective link quality associated with each of the respective links.

The electronic device 102 may then select one of the available links, such as the first listed link in the list, as the secondary connection for the communication session (308). For example, if the primary connection for the communication session is established using a link characterized by local and remote Wi-Fi communication interfaces, the secondary connection for the communication session may be established using a link characterized by local and remote cellular communication interfaces, such that if the primary connection for communicating between the local and/or remote Wi-Fi communication interfaces fails, the secondary connection for communicating between the local and remote cellular communication interfaces may still be available.

The electronic device 102 may transmit application data (e.g., audio and/or video data) and control data (e.g., control signaling messages) for the communication session to the other electronic device 104 via the primary connection (310). The electronic device 102 may also transmit a copy of at least a portion of the control data to the other electronic device 104 over the secondary connection (312). The portion of the control data may include control data and/or control messages that may facilitate a smooth user experience for the communication session. For example, the portion of the control data may include, for example, request for key frames, session termination messages, and the like.

When the attempt to establish the first link with the other electronic device 104 (e.g., a link characterized by local and remote Wi-Fi communication interfaces) as the primary connection for the communication session (302) failed, and after establishing the primary connection via the second link (304), the electronic devices 102, 104 may attempt to determine whether the local and/or remote Wi-Fi communication interface is caused the first link to fail. For example, the link may fail when one of the electronic devices 102, 104 has a broken backhaul with respect to the Wi-Fi communication interface, even if the other one of the electronic devices 102, 104 does not have a broken backhaul.

Thus, the electronic devices 102, 104 may attempt to establish additional links that utilize a local Wi-Fi communication interface and a remote cellular communication interface, and a local cellular communication interface and a remote Wi-Fi communication interface. Based on which of the links can be successfully established, the electronic devices 102, 104 may determine that one of the electronic devices 102, 104 is experiencing a broken backhaul with respect to the Wi-Fi communication interface. Thus, the one of the electronic devices 102, 104 that is experiencing the broken backhaul with respect to the Wi-Fi communication interface may utilize another local communication interface, such as the cellular communication interface, to determine that the backhaul is broken with respect to the Wi-Fi communication interface. In one or more implementations, the one of the electronic devices 102, 104 that is experiencing the broken backhaul with respect to the Wi-Fi communication interface may display a notification of the same to the user.

In one or more implementations, the electronic device 102 may continuously monitor and assess the available links throughout the communication session, such as for purposes of dynamically updating the link used for the secondary connection, such as based on link quality and/or one or more of the aforementioned heuristics. For example, the electronic device 102 may periodically probe the available links to assess a link quality of each of the available links. The link quality may be assessed based on one or more of roundtrip time, the number of packets sent, the number of packets received, were the responses received out of order (e.g., based on timestamps), whether a response was received or a timeout occurred, and the like. In one or more implementations, the electronic device 102 may utilize keepalive packets, e.g., packets transmitted over the links for purposes of keeping the links active/alive, to assess the quality of the links.

In one or more implementations, the electronic device 102 may initially probe each of the links at a first interval, and when an indication is received that indicates that the primary connection, and/or a particular local and/or remote interface is about to degrade below a particular link quality threshold (such as based on one or more link quality metrics assessed for the primary connection), the electronic device 102 may begin probing each of the links at a second interval that is smaller than the first interval. Thus, the electronic device 102 may transmit probing packets (e.g., the keepalive packets) more frequently once the indication is received. In this manner, the assessment of the link quality of the available links by the electronic device 102 may be refreshed more frequently when the primary connection, and/or a particular interface, is about to degrade, such that if the primary connection does degrade the best available link (e.g., the link with the highest link quality) can be dynamically selected for the secondary connection.

Figure 4:
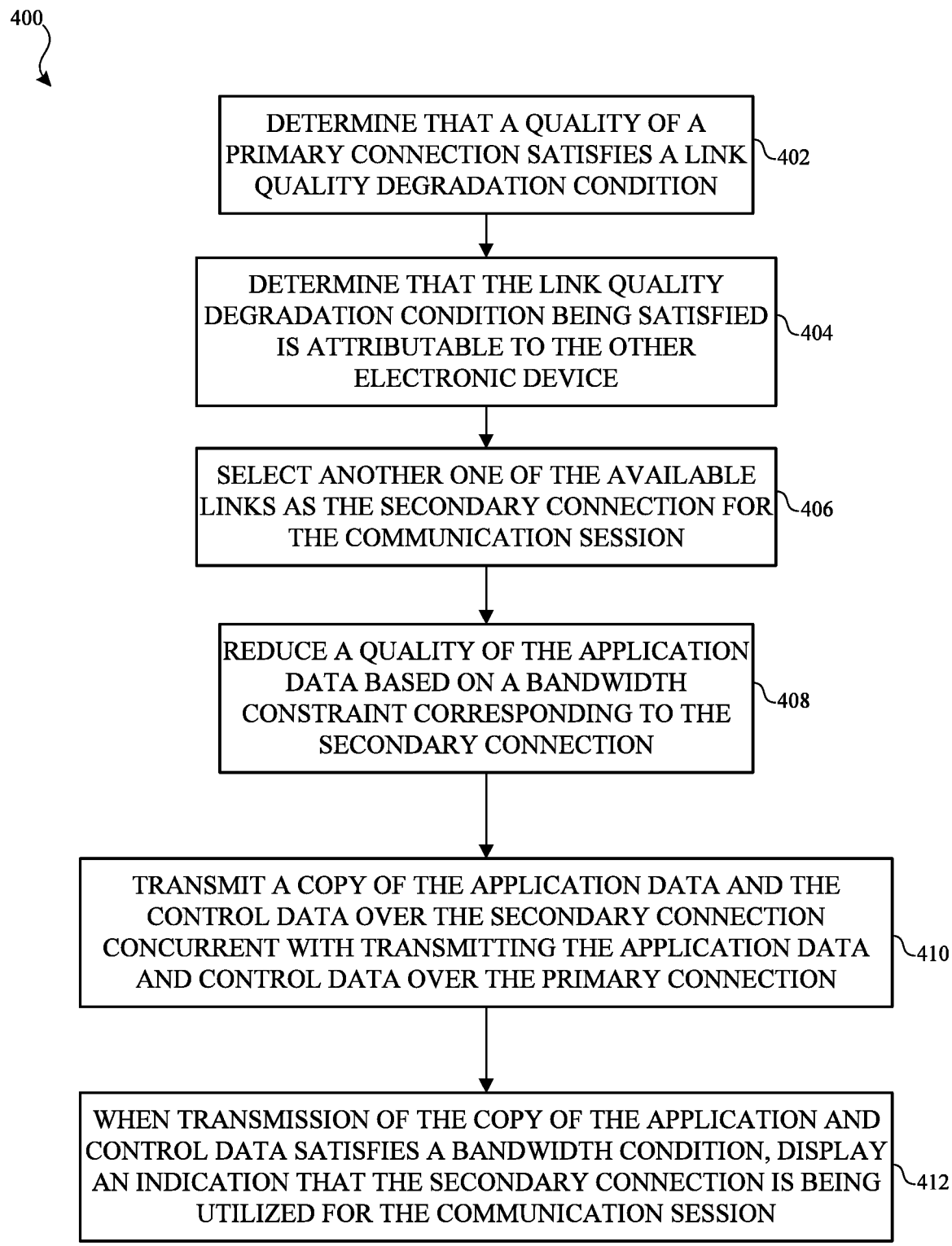
FIG. 4 illustrates a flow diagram of an example process of multi-path connection management in accordance with one or more implementations.

FIG. 4 illustrates a flow diagram of an example process 400 of multi-path connection management in accordance with one or more implementations. For explanatory purposes, the process 400 is primarily described herein with reference to the electronic devices 102, 104 of FIG. 1. However, the process 400 is not limited to the electronic devices 102, 104 of FIG. 1, and one or more blocks (or operations) of the process 400 may be performed by one or more other components of the server 108 and by other suitable devices (e.g., any of the electronic devices 102-104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may begin after the electronic device 102 has established a primary connection, such as characterized by local and remote Wi-Fi communication interfaces, and a secondary connection, such as characterized by local and remote cellular communication interfaces, for a communication session with another electronic device 104. During the communication session, the electronic devices 102, 104 may exchange link quality metrics, such as round trip time, end-to-end packet loss rate, an amount of time without receiving any packets, a signal to noise ratio, and the like.

The electronic device 102 may determine that a quality of the primary connection satisfies a quality degradation condition, such as based on the exchanged link quality metrics (402). For example, the electronic device 102 may determine that one or more of the packet loss rate, the round trip time, the amount of time without receiving any packets, or the signal to noise ratio, has exceeded a predetermined threshold value.

The electronic device 102 may then determine that the link quality degradation condition being satisfied is attributable to the other electronic device 104 (404). For example, the electronic device 102 may determine, based on one or more local and/or remote signal quality metrics, that the degradation of the link quality is being caused by changing network conditions associated with the other electronic device 104. For example, when the primary connection is utilizing the Wi-Fi communication interface of each of the electronic devices 102, 104, the electronic device 102 may determine that its own Wi-Fi environment/signal metrics are stable and/or constant, while the electronic device 104 may be moving and therefore the Wi-Fi environment/signal metrics at the electronic device 104 may be changing.

The electronic device 102 may then select another one of the available links as the secondary connection for the communication session (406). For example, since the electronic device 102 determined that the degradation of the quality of the primary connection is attributable to the other electronic device 104 (and independent of the Wi-Fi communication interface of the electronic device 102), the electronic device 102 may select another link that is characterized by a local Wi-Fi communication interface and a remote cellular communication interface. Thus, since the Wi-Fi communication interface of the electronic device 102 is stable, the electronic device 102 may use the Wi-Fi communication interface for both the primary and secondary connections. In one or more implementations, if the electronic device 102 has a wired connection, e.g. a wired Ethernet connection, the wired Ethernet connection may be used for both the primary and secondary connections.

In one or more implementations, if the electronic device 102 cannot determine that the degradation of the link quality of the primary connection is attributable to the other electronic device 104 (404), the electronic device 102 may not select another link for the secondary connection. Instead, the electronic device 102 may utilize the established secondary connection that is characterized by local and remote cellular communication interfaces.

The electronic device 102 may then reduce a quality of the transmitted application data based on a bandwidth constraint corresponding to the secondary connection (408). For example, since the secondary connection utilizes the cellular communication interface of the electronic device 104, the bandwidth of the secondary connection may be constrained to the cellular connection of the electronic device 104. Furthermore, since the secondary connection is being utilized concurrently with the primary connection, and therefore the use of the communication interface for the secondary connection may not be visible to the user, there may be a data rate constraint imposed on utilizing the cellular communication interface for the secondary connection, such as 5 kbps, 10 kbps, or any data rate constraint. Thus, the electronic device 102 may reduce the quality of the audio and/or video streams transmitted over the primary connection such that a copy of the audio and/or video streams transmitted over the secondary connection will not exceed the data rate constraint corresponding to the secondary connection.

The electronic device 102 transmits a copy of the application data (e.g., video and/or audio streams) and the control data over the secondary connection concurrent with transmitting the application data (at the reduced quality) and the control data over the primary connection (410). When the electronic device 102 is utilizing a cellular communication interface (or other communication interface associated with metered data use) for the secondary connection, the electronic device 102 may monitor an instantaneous or running average or data being transferred over the secondary connection for the copy of the application data and the control data.

When the transmission of the application and control data satisfies the bandwidth condition, e.g. when the instantaneous or running average exceeds a pre-determined threshold amount and/or for a predetermined amount of time, the electronic device 102 displays an indication that the secondary connection is being utilized for the communication session (412). For example, the electronic device 102 may display a textual or graphical indication that the cellular communication interface, or another communication interface, is being utilized for the communication session. The indication may be separate from, and independent of, the audio and/or video data being transmitted. Since the electronic device 102 is still connected via the Wi-Fi communication interface, the operating system of the electronic device 102 may indicate that the electronic device 102 is connected via Wi-Fi and may not otherwise indicate that the cellular communication interface is being utilized to transmit data.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 5:
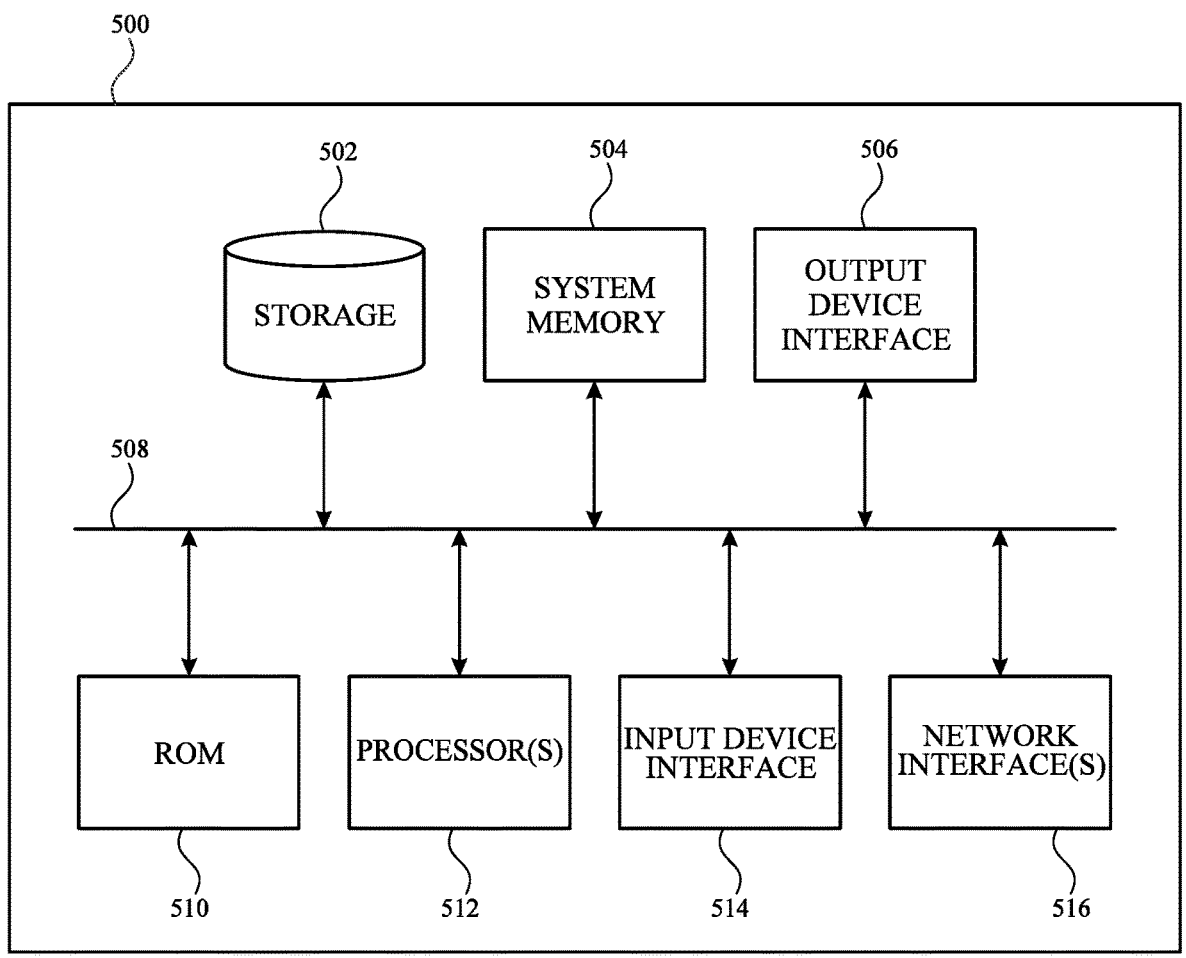
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, one or more of the electronic devices 102-104, and/or one or the server 108 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the server 108 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   attempting, by a device, to establish a first link as a primary connection for communicating with an other device;
   when the first link cannot be established within a threshold amount of time, attempting to establish a second link as the primary connection for communicating with the other device, the second link differing from the first link; and
   upon establishing the first or second link as the primary connection for communicating with the other device:
      attempting to establish a plurality of additional available links for communicating with the other device;
      selecting an additional available link from the plurality of attempted additional available links as a secondary connection for communicating with the other device;
      transmitting application data and control data over the primary connection; and
      concurrently transmitting a copy of at least a portion of the control data over the secondary connection.

2. The method of claim 1, further comprising:
   detecting that a quality of the primary connection satisfies a link quality degradation condition; and
   responsive to detecting that the quality of the primary connection satisfies the link quality degradation condition, initiate concurrently transmitting a copy of at least a portion of the application data over the secondary connection.

3. The method of claim 2, further comprising:
   responsive to detecting that the quality of the primary connection satisfies the link quality degradation condition and prior to concurrently transmitting the copy of the at least the portion of the application data over the secondary connection:
      determining that the quality of the primary connection satisfying the link quality degradation condition is caused by the other device; and
      select another additional available link of the plurality of attempted additional available links as the secondary connection with the other device, the other additional available link being distinct from the first link and the additional available link.

4. The method of claim 2, further comprising:
   responsive to detecting that the quality of the primary connection satisfies the link quality degradation condition, reducing a quality of the application data transmitted over the primary connection based at least in part on a bandwidth constraint of the secondary connection.

5. The method of claim 2, further comprising:
   when transmission of the copy of the at least the portion of the application data satisfies a bandwidth condition, display an indication that the copy of the at least the portion of the application data is being transmitted over the secondary connection, the indication being separate and independent from display of the application data.

6. The method of claim 2, wherein detecting that the quality of the primary connection satisfies the link quality degradation condition comprises:
   detecting that at least one of a round trip time metric, a packet loss metric, or a time without receiving packets metric satisfies the link quality degradation condition.

7. The method of claim 1, wherein the second link differs from the first link based at least in part on one or more of: a packet type, an interne protocol (IP) version, or a connection type.

8. The method of claim 7, wherein the packet type comprises at least one of a user data protocol (UDP) packet or a transmission control protocol (TCP) packet, the IP version comprises at least one of IPv4 or IPv6, and the connection type comprises at least one of a peer-to-peer connection or a connection through a relay server.

9. The method of claim 1, further comprising:
   generating a list of the plurality of attempted additional available links with the other device, the plurality of attempted additional available links including at least one other additional available link that is distinct from the first link and the additional available link; and
   continuously re-evaluating the plurality of additional available links with the other device and updating the list accordingly.

10. The method of claim 1, further comprising:
    transmitting, to the other device, a list of available local communication interfaces;
    receiving, from the other device, a list of available remote communication interfaces; and
    generating the plurality of additional available links based at least in part on the list of available local communication interfaces and the list of available remote communication interfaces.

11. The method of claim 1, further comprising:
    detecting that a least one of the primary connection or the secondary connection has disconnected; and
    selecting at least one other additional available link of the plurality of attempted additional available links as the at least one of the primary connection or the secondary connection that disconnected, the at least one other additional available link being distinct from the first link and the additional available link.

12. The method of claim 1, wherein at least one of: a first local communication interface of the first link differs from a second local communication interface of the second link, or a first remote communication interface of the first link differs from a second remote communication interface of the second link.

13. A device comprising:
a first local communication interface;
a second local communication interface;
at least one processor configured to:
- establish a primary connection for communicating between the first local communication interface and a first remote communication interface of an other device;
- establish a secondary connection for communicating between the second local communication interface and a second remote communication interface of the other device;
- transmit application data and control data over the primary connection and concurrently transmit at least a portion of the control data over the secondary connection;
- determine that a quality of the primary connection satisfies a degradation condition;
- determine that the quality of the primary connection satisfying the degradation condition is attributable to the first remote communication interface of the other device;
- switch the secondary connection to utilize the first local communication interface and the second remote communication interface; and
- transmit a copy of the application data and the control data over the secondary connection while concurrently transmitting the application data and the control data over the primary connection.

14. The device of claim 13, wherein the first local communication interface and the first remote communication interface comprise a first communication interface type, and the second local communication interface and the second remote communication interface comprise a second communication interface type.

15. The device of claim 14, wherein the first communication interface type comprises a Wi-Fi communication interface and the second communication interface type comprises a cellular communication interface.

16. The device of claim 14, wherein the at least the portion of the control data comprises at least one of a request for a key frame or a connection termination message.

17. A non-transitory machine-readable medium comprising code that, when executed by one or more processors causes the one or more processors to perform operations, the code comprising:

- code to attempt, for a pre-determined amount of time, to establish a primary connection for communicating between a first combination of at least a first local communication interface and a first remote communication interface of an other device;
- code to, when the primary connection is not established for the pre-determined amount of time, attempt to establish the primary connection for communicating between a second combination of at least a second local communication interface and a second remote communication interface of the other device;
- code to, upon establishing the primary connection, establish a secondary connection for communicating between a third combination of at least one of the first or second local communication interfaces and at least one of the first or second remote communication interfaces, the third combination differing from the first or second combination for which the primary connection was established; and
- code to transmit application data and control data over the primary connection and a copy of at least a portion of the control data over the secondary connection.

18. The non-transitory machine-readable medium of claim 17, wherein the code further comprises:
- code to detect that a quality of the primary connection satisfies a connection degradation condition; and
- code to, responsive to detection that the quality of the primary connection satisfies the connection degradation condition, transmit a copy of the application data and a copy of the control data over the secondary connection.

19. The non-transitory machine-readable medium of claim 18, wherein the code further comprises:
- code to, when transmission of the copy of the application data and the copy of the control data satisfies a bandwidth condition, display an indication that the copy of the at least the portion of the application data is being transmitted over the secondary connection, the indication being displayed separately and independently from display of the application data.

20. The non-transitory machine-readable medium of claim 17, wherein the first combination of at least the first local communication interface and the first remote communication interface further comprises at least one of a packet type, a connection type, or an internet protocol (IP) version type.

* * * * *

UNITED STATES PATENT AND TRADEMARK OFFICE
CERTIFICATE OF CORRECTION

PATENT NO. : 11,757,978 B2
APPLICATION NO. : 17/006738
DATED : September 12, 2023
INVENTOR(S) : Daniel B. Pollack et al.

It is certified that error appears in the above-identified patent and that said Letters Patent is hereby corrected as shown below:

In the Claims

Column 16, Line 24 (Claim 7):
"an interne protocol (IP)"
Should read:
--an internet protocol (IP)--

Signed and Sealed this
Ninth Day of January, 2024

Katherine Kelly Vidal
*Director of the United States Patent and Trademark Office*